United States Patent [19]

Hsu

[11] Patent Number: 5,367,781
[45] Date of Patent: Nov. 29, 1994

[54] DIRECTIONAL INDICATOR

[76] Inventor: Simon Hsu, 10 Fl., No. 413, Lin San N. Rd., Taipei, Taiwan, Prov. of China

[21] Appl. No.: 107,993

[22] Filed: Aug. 18, 1993

[51] Int. Cl.$^5$ .................... G01C 17/04; G01C 17/14
[52] U.S. Cl. .................... 33/349; 33/355 R
[58] Field of Search ............ 33/332, 346, 347, 349, 33/350, 352, 355 R, 364

[56] References Cited

U.S. PATENT DOCUMENTS

| 920,587 | 5/1909 | Laube | 33/349 |
|---|---|---|---|
| 1,107,901 | 8/1914 | Colombel | 33/349 |
| 1,332,027 | 2/1920 | Bunker | 33/349 |
| 2,014,024 | 9/1935 | Leatherman | 33/349 |
| 2,108,263 | 2/1938 | L'Abee-Lund | 33/349 |
| 2,528,339 | 10/1950 | Collins | 33/355 R |
| 3,613,251 | 10/1971 | Fitzpatrick et al. | 33/355 R |
| 4,089,118 | 5/1978 | Howard | 33/355 R |
| 4,184,267 | 1/1980 | Lenbary | 33/349 |

FOREIGN PATENT DOCUMENTS

| 435114 | 2/1912 | France | 33/349 |
|---|---|---|---|
| 330803 | 10/1935 | Italy | 33/352 |
| 31187 | 8/1909 | Sweden | 33/349 |
| 4761 | 12/1912 | United Kingdom | 33/349 |
| 21411 | 12/1915 | United Kingdom | 33/349 |
| 566663 | 1/1945 | United Kingdom | 33/349 |

*Primary Examiner*—Thomas B. Will
*Attorney, Agent, or Firm*—Bacon & Thomas

[57] ABSTRACT

A directional indicator made to fasten around the wrist for guiding the user in a predetermined direction, including a magnetized needle attached rotating dial balanced on a pointed pin inside a casing, a needle pointer fastened to a center shaft on the rotating dial, a convex lens covered on the casing over the rotating dial and marked with a fluorescent mark, whereby the needle pointer is maintained in alignment with the fluorescent mark to guide the user toward the predetermined direction.

3 Claims, 4 Drawing Sheets

DIRECTIONAL INDICATOR

BACKGROUND OF THE INVENTION

The present invention relates to a directional indicator made to fasten around the wrist for guiding the user in a predetermined direction.

Various compasses are known and widely used for determining direction. These compasses commonly use a magnetized needle to indicate magnetic north for determining direction. They can not apparently show the direction in which the user wishes to go. While moving, the user shall have to frequently check the compass and then correct the moving direction.

SUMMARY OF THE INVENTION

The present invention has been accomplished under the aforesaid circumstances. It is therefore the principal object of the present invention to provide a directional indicator which guides the user in the predetermined direction. This object is achieved by fastening a needle pointer to the center shaft of a rotating dial, which is attached with a magnetized needle and balanced on a pointed pin inside a casing, and marking a fluorescent mark on a convex lens, which covers the casing over the rotating dial. The needle pointer guides the user in the predetermined direction as the needle pointer is maintained in alignment with the fluorescent mark.

DETAILED DESCRIPTION OF THE PREFERRED EMBODIMENT

Figure 1:
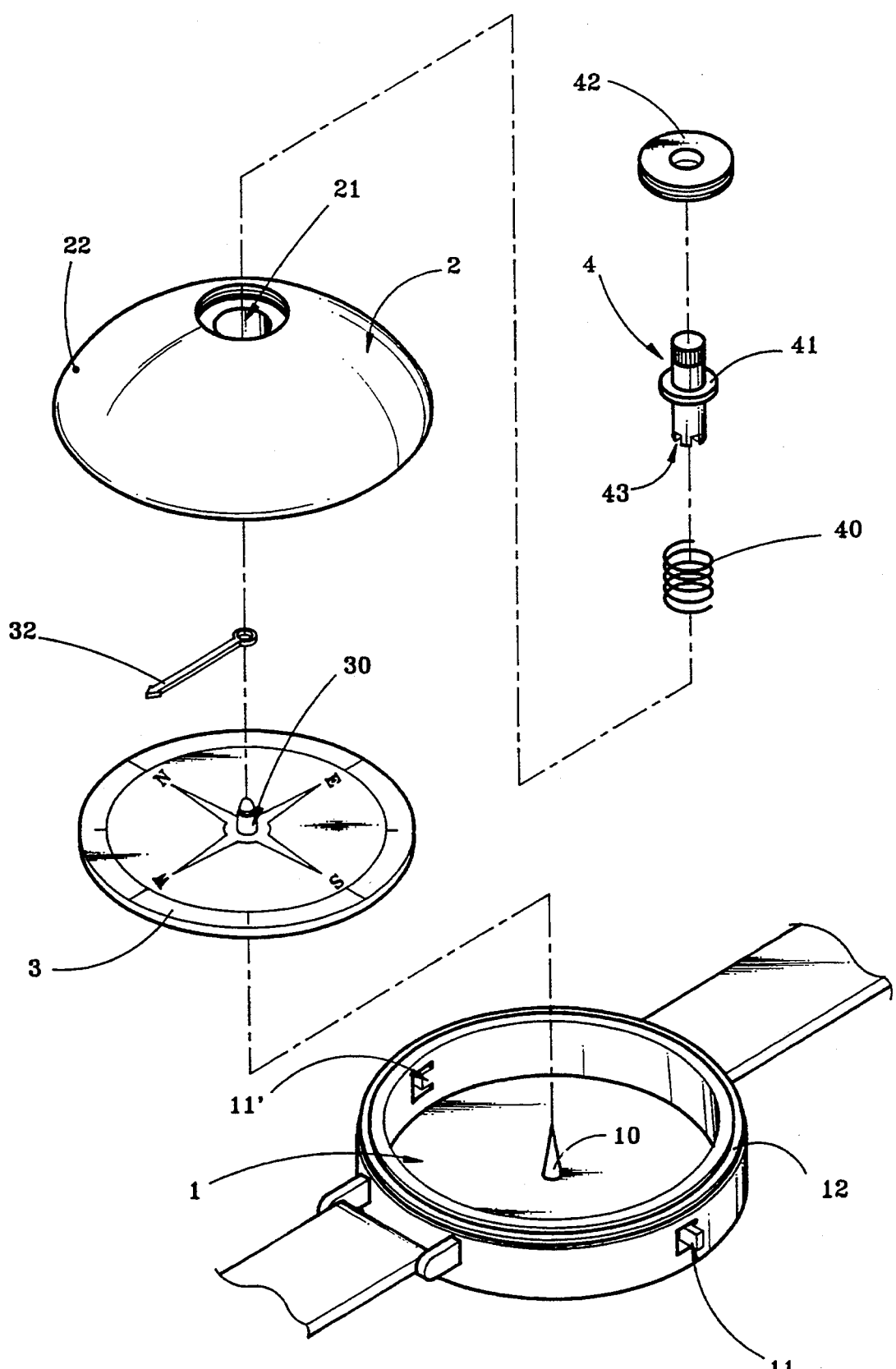
FIG. 1 is an exploded view of a directional indicator according to the preferred embodiment of the present invention.
Figure 2:
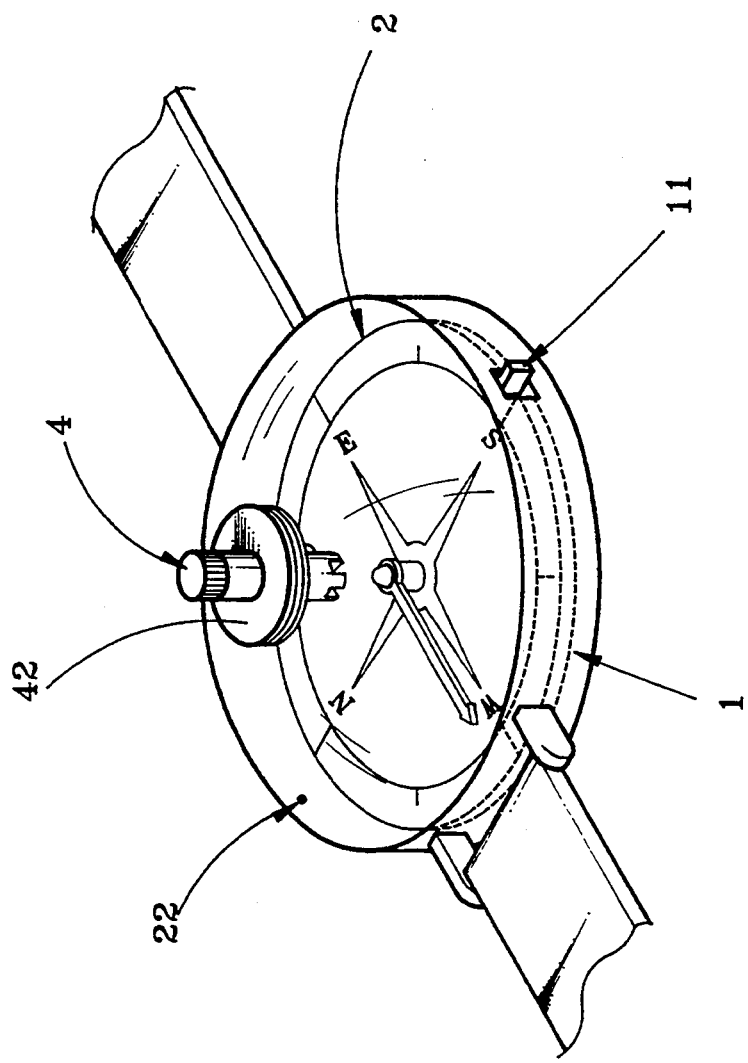
FIG. 2 is an elevational perspective view of the directional indicator.
Figure 3:
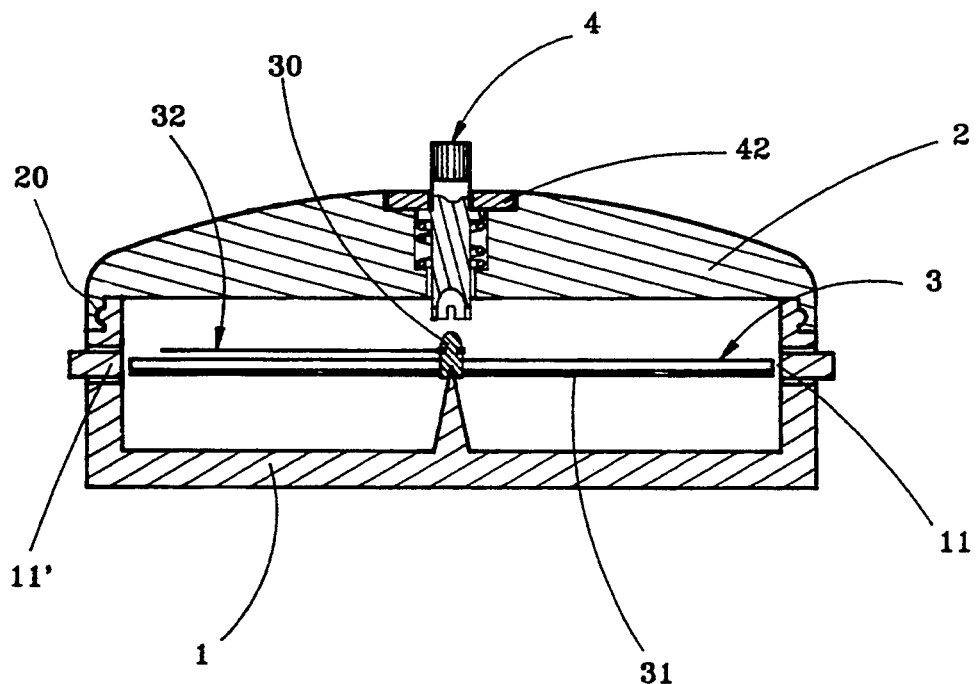
FIG. 3 is a sectional side view of the directional indicator.

Referring to FIGS. 1, 2, and 3, a directional indicator in accordance with the preferred embodiment of the present invention is generally comprised of a casing 1, a rotating dial 3 fastened inside the casing 1, and a convex lens 2 covered on the casing 1 over the rotating dial 3. The casing 1 is made in the form of a circular container having a top opening, suitable for fastening around the wrist. It is most preferable that the casing 1 is made of plastics through an injection molding process. The casing 1 comprises a pointed upright pin 10 in the center, an annular top flange 12 around the topmost edge thereof, and two unitary, flexible friction members 11;11' on two opposite sides thereof. The rotating dial 3 is marked with graduations for indicating directions, comprising a shaft 30 in the center. A needle pointer 32 is fastened to the shaft 30 above the rotating dial 3. The needle pointer 32 can be turned on the shaft 30 and then set in position to indicate a fixed direction. As the rotating dial 3 is turned round and round, the needle pointer 32 is simultaneously carried to turn round and round. A magnetic needle 31 is fastened to the rotating dial 3 at the bottom that indicates magnetic north. The rotating dial 3 is received inside the casing 1 and balanced on the pointed upright pin 10. The rotating dial 3 can be firmly retained in position by pressing the friction members 11;11' inwards, and therefore the needle pointer 32 can be rotated on the shaft 30 to change the direction. The convex lens 2 comprises an annular bottom groove 20 around the border. By engaging the annular top flange 12 on the casing 1 into the annular bottom groove 20 on the convex lens 2, the convex lens 2 is fastened to the casing 1 and covered over the rotating dial 3. The convex lens 2 further comprises a stepped center axle hole 21 in line with the shaft 30 on the rotating dial 3, and a fluorescent mark 22 near the border. An adjustment rod 4 is fastened in the stepped center axle hole 21 by a thrust ring 42. A compression spring 40 is retained inside the stepped center axle hole 21 around the adjustment rod 4, and stopped between a stop wall (not shown) inside the stepped center axle hole 21 and a collar 41 on the adjustment rod 4. The top end of the adjustment rod 4 extends out of the thrust ring 42. The bottom end of the adjustment rod 4 terminates to a pawl 43 spaced above the shaft 30 of the rotating dial 3.

Figure 4:
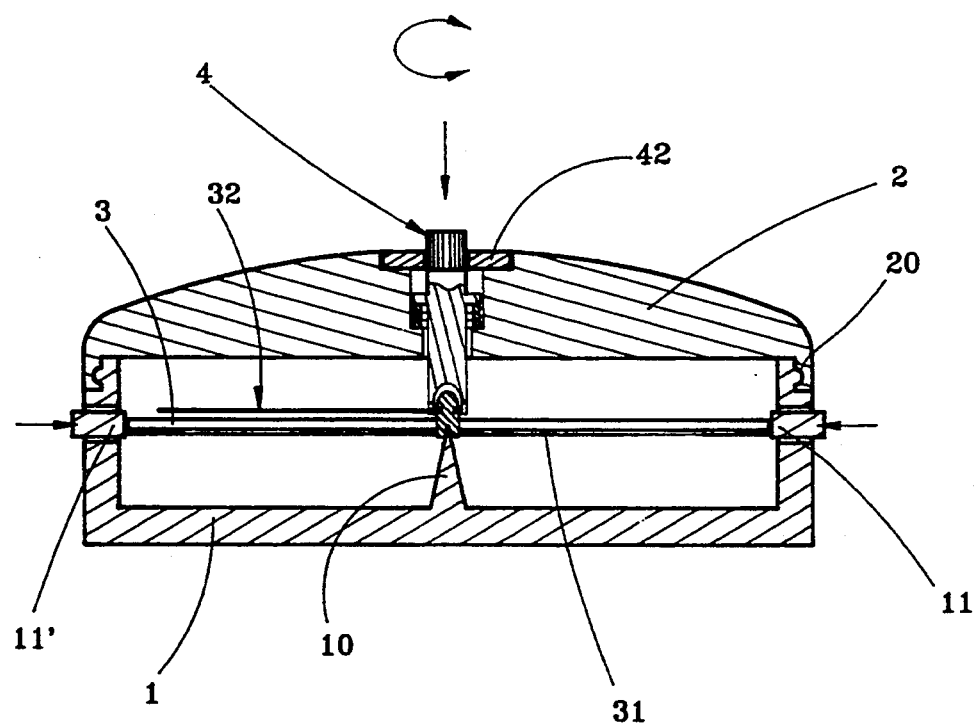
FIG. 4 is similar to FIG. 3 but showing the adjustment rod pressed and turned to adjust the direction of the needle pointer.

Referring to FIG. 4, the directional position of the needle pointer 32 on the rotating dial 3 can be conveniently adjusted by: pressing the friction members 11;11' inward to hold tight the rotating dial 3, then pressing the adjustment rod 4 downward to let the pawl 43 catch the head of the needle pointer 33, and then rotating the adjustment rod 4 to turn the needle pointer 32 on the shaft 30. When adjusted, the adjustment rod 4 will be automatically pushed away from the shaft 30 by the compression spring 40, and therefore the needle pointer 32 is firmly retained in the adjusted direction.

Figure 5:
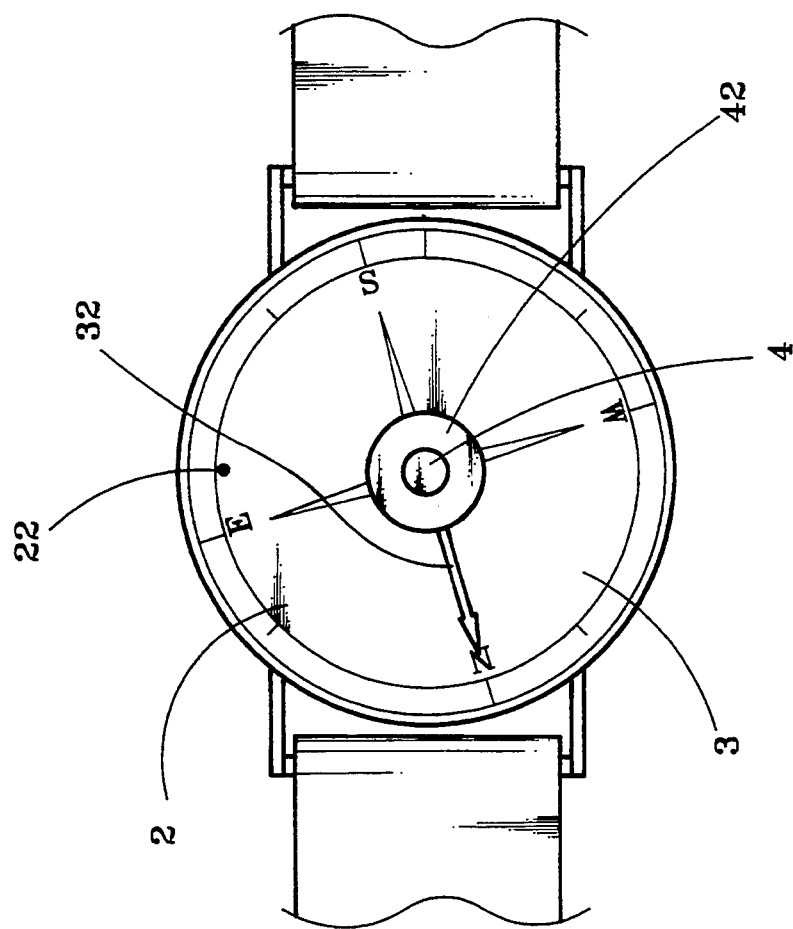
FIG. 5 is a top view of the directional indicator, showing the position of the fluorescent mark on the convex lens.

Referring to FIG. 5, when in use, the directional indicator is fastened around the wrist, and the fluorescent mark 22 on the convex lens 2 is disposed in the front (the forward direction). The user can then keep moving in the predetermined direction according to the indication of the needle pointer 32 as the needle pointer 32 and the fluorescent mark 22 are maintained in perfect alignment. The needle pointer 32 may be coated with a layer of fluorescent paste for use in dark conditions.

I claim:

1. A directional indicator comprising:
   a casing for fastening around a wrist of a user, said casing comprising a bottom, side walls and a top opening, a pointed upright pin attached in the center of the bottom, two flexible friction members projecting into the casing from two opposite holes located in the side walls;
   a rotating dial having a magnetized needle attached thereto and balanced on said pointed upright pin in alignment with the two flexible friction members, said rotating dial including a center shaft projecting therefrom with a needle pointer rotatably fastened thereto and adjustable for pointing in a predetermined direction; and
   a convex lens attached to said casing over said rotating dial, said convex lens including a fluorescent mark near its border and a stepped hole in its center, an adjustment rod supported on a spring and retained by a thrust ring in said stepped center hole; whereby said needle pointer is maintained in alignment with said fluorescent mark to guide the user toward the predetermined direction; said adjustment rod can be pressed down to contact said needle pointer and turned to rotate said needle pointer on said rotating dial as said friction members are respectively pressed inward to hold tight said rotating dial.

2. The directional indicator of claim 1 wherein said rotating dial is marked with graduations for indicating directions.

3. The directional indicator of claim 1 wherein said needle pointer is coated with a layer of fluorescent paste.

* * * * *